INVENTORS
Gene E. Lightner
Howard B. Muhlestein
BY Mortenson and Weigel
ATTORNEYS United States Patent Office 3,529,475
Patented Sept. 22, 1970

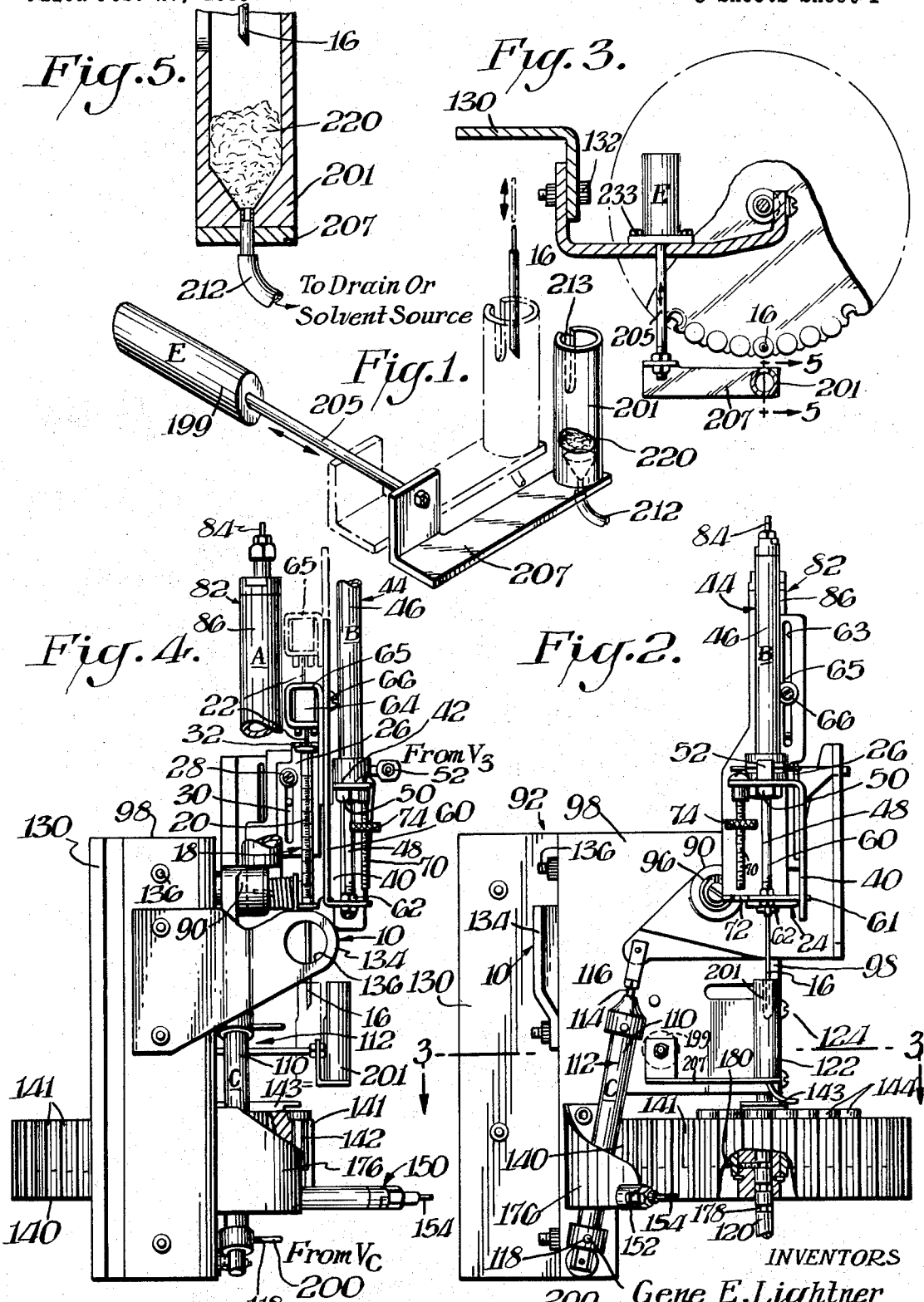

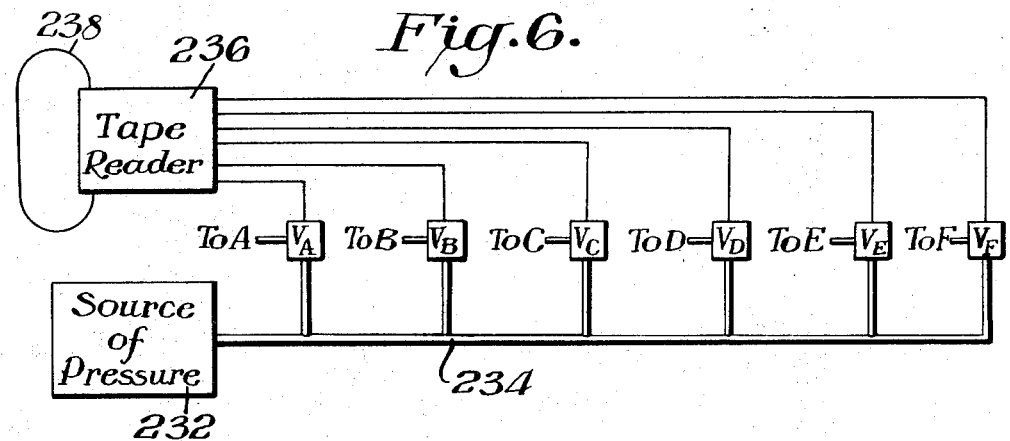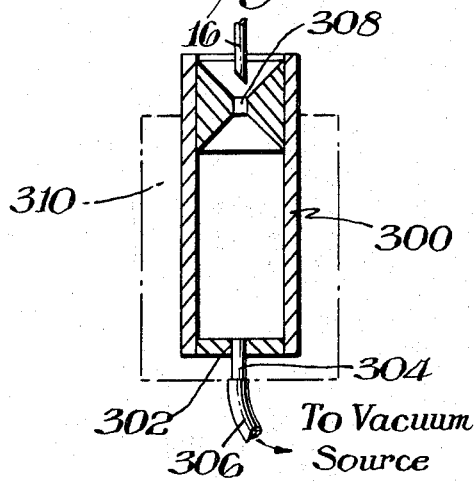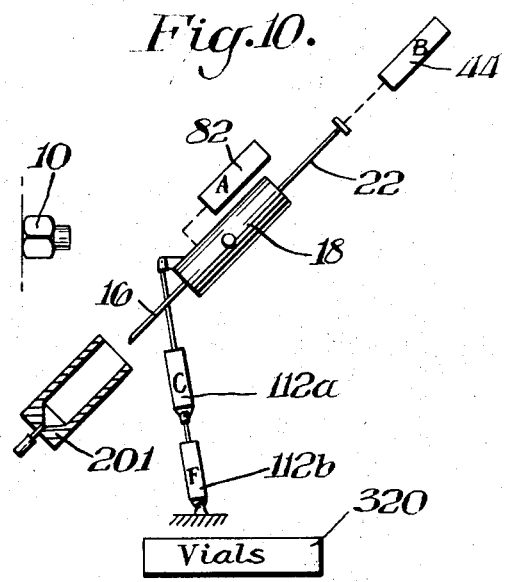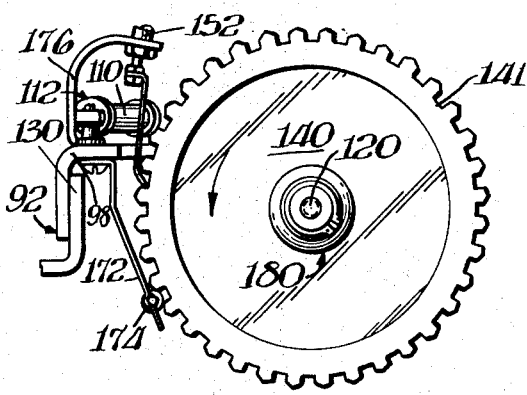

3,529,475
AUTOMATIC FLUID SAMPLING SYSTEM
Gene E. Lightner, Kennett Square, Pa., and Howard B. Muhlestein, Wilmington, Del., assignors to Hewlett-Packard Company, Palo Alto, Calif., a corporation of California
Filed Feb. 26, 1969, Ser. No. 802,420
Int. Cl. G01n 1/14
U.S. Cl. 73—423     10 Claims

ABSTRACT OF THE DISCLOSURE

A syringe needle is introduced into a sample vial at a sample pickup location, filled with sample fluid, removed from the vial, and then shifted relative to the vial to be in alignment with the injection port of an analytical instrument. The needle is then inserted into the injection port, the sample ejected, the needle removed from the injection port and introduced into an additional receptacle used for cleaning or collecting waste, the next sample indexed to the sample pickup location, and the cycle repeated. This complete operation is controlled by a total of five prime movers which may be digitally controlled in any desired sequence.

BACKGROUND OF THE INVENTION

This invention relates to an automatic fluid sampling system and, more particularly, to an automatic fluid sampling system that facilitates cleaning of the system.

With the increased cost of direct manpower it is becoming more and more imperative to provide both semi and fully automatic systems for performing analyses using gas chromatographs and other analytical instruments. Two of the most time consuming functions for the analyst are sample injection into the gas chromatograph or other analytical instrument, and data interpretation and quantization. Integrators, multiplexers, A/D converters, and computers allow substantial savings in these latter areas. Unfortunately, however, full automation of the analysis function still awaits the development of a versatile, reliable automatic means of sample injection. Such automatic sample injector should be capable of repeatably extracting a precise sample of a fluid to be analyzed from a sample container and inject the same into the analytical instrument.

In the case of gas chromatography, several such systems have been developed. One of these systems utilizes a rotating valve which has a number of sample volume ports. The rotating valve is rotated to position these ports successively into a line leading to the gas chromatograph injection port. A volume of wash solvent may be used to flush the total sample into the injection port. Unfortunately, such systems have encountered problems such as a solvent peak showing up on the resulting chromatogram, leaks between the adjacent ports resulting in cross-contamination of the samples and, finally, the apparatus has required careful cleaning by hand after each use.

Other techniques have envisioned vapor rather than fluid sampling. These require that the liquid sample be vaporized and the vapor sampled with a conventional gas chromatograph gas sampling valve. This technique is workable but is accompanied by the problems of temperature and pressure control of the sample. Without relatively precise temperature and pressure control, sample sizes tend to vary resulting in inaccuracies of the analysis. Cleaning has also been a problem.

Still other techniques have envisioned utilizing a low melting point sample tube made of an alloy. The liquid sample is loaded into a tube, the ends crimped, and the tubes loaded into an automatic rotating feeder which injects them into a heater where the tube is melted and the sample vaporized. Unfortunately, this technique has resulted in wide variation in sample size and considerable manpower is required to load the sample tubes in the first instance. Furthermore, the different melting rates of the tubes causes variation in programmed temperature analysis. Other techniques, such as the use of preloaded (by hand) syringes has also been proposed, but have been accompanied by problems in the successful implementation thereof.

In a co-pending application, S.N. 760,538 filed Sept. 18, 1968, entitled "Automatic Liquid Sampler" by Gene Lightner et al. and assigned to the same assignee as the subject invention, a unique automatic sampling system is described which uses a single fluid transfer tube or syringe to successively sample plural sample containers and introduce the fluid sample into an analytical instrument. One of the problems that must be taken into account in automatic systems of this type is the cross-contamination that can occur between successive samples. To reduce such cross-contamination from one sample to the next, the syringe or fluid transfer tube must be thoroughly cleansed between each sample. This can be relatively simply accomplished by alternating the sample containers with a container of a cleaning solvent so that after each sample, a container of cleaning solvent is indexed into the sampling location and the syringe introduced into the solvent and flushed. With each flushing, the syringe may be discharged onto the top of the solvent vial but this can cause cross-contamination. Preferably the syringe should be discharged into a waste receptacle or introduced into a receptacle which performs the function of cleaning the syringe either by heating and evaporating the contaminating materials or flushing them with a solvent.

It is, therefore, an object of this invention to provide a system which is capable of providing a receptacle for use in an automatic sampling system for cleaning the fluid transfer tube.

Another object of this invention is to provide an improved, automatic fluid sampling system having a waste receptacle for the receipt of waste material.

BRIEF DESCRIPTION OF THE INVENTION

The preferred embodiment of this invention contemplates an automatic sampling system for introducing fluid samples into a sample receiving chamber. The system includes a sample rack which successively positions sample containers to a sampling location, a fluid transfer tube for transferring fluid between the sampling location and the sample receiving chamber, and an auxiliary receptacle for use in cleaning the fluid transfer tube. An actuating means is coupled for displacing the fluid transfer tube and the auxiliary receptacle relative to each other in such a manner as to bring the two in alignment. A pump means is coupled to the tube for transferring fluid to and from the receptacle or, if the auxiliary receptacle contains a means for cleaning the fluid transfer tube, it may receive the tube directly to permit flushing and cleaning of the tube.

BRIEF DESCRIPTION OF THE DRAWINGS

The novel features that are considered characteristic of this invention are set forth with particularity in the appended claims. The invention itself, however, both as to its organization and method of operation as well as additional objects and advantages thereof, will best be understood from the following description when rear in connection with the accompanying drawings, in which:

FIG. 1 is a pictorial view of one form of an auxiliary receptacle mounted to be positioned by a prime mover that may be used in conjunction with this invention;

FIG. 2 is a side elevation view of an automatic sampling system adapted to utilize the auxiliary receptacle illustrated in FIG. 1;

FIG. 3 is a top view of the automatic sampling system illustrated in FIG. 2;

FIG. 4 is a back elevation view of the automatic sampling system illustrated in FIG. 2 with a portion of one of the prime movers cutaway for clarity of illustration;

FIG. 5 is a cross-sectional view of the auxiliary receptacle illustrated in FIG. 1;

FIG. 6 is a block, schematic diagram showing the digital control system utilized to operate the prime movers of the automatic sampling system of FIG. 2;

FIG. 7 is a cross-sectional view of an alternative embodiment of the auxiliary receptacle of this invention which facilitates cleaning of a fluid transfer tube;

FIG. 10 is a diagrammatic representation of an alternative embodiment of the system illustrated in FIGS. 2–4; and FIG. 11 is a bottom view of the turntable assembly of FIG. 2.

DESCRIPTION OF THE PREFERRED EMBODIMENTS

Figure 8:
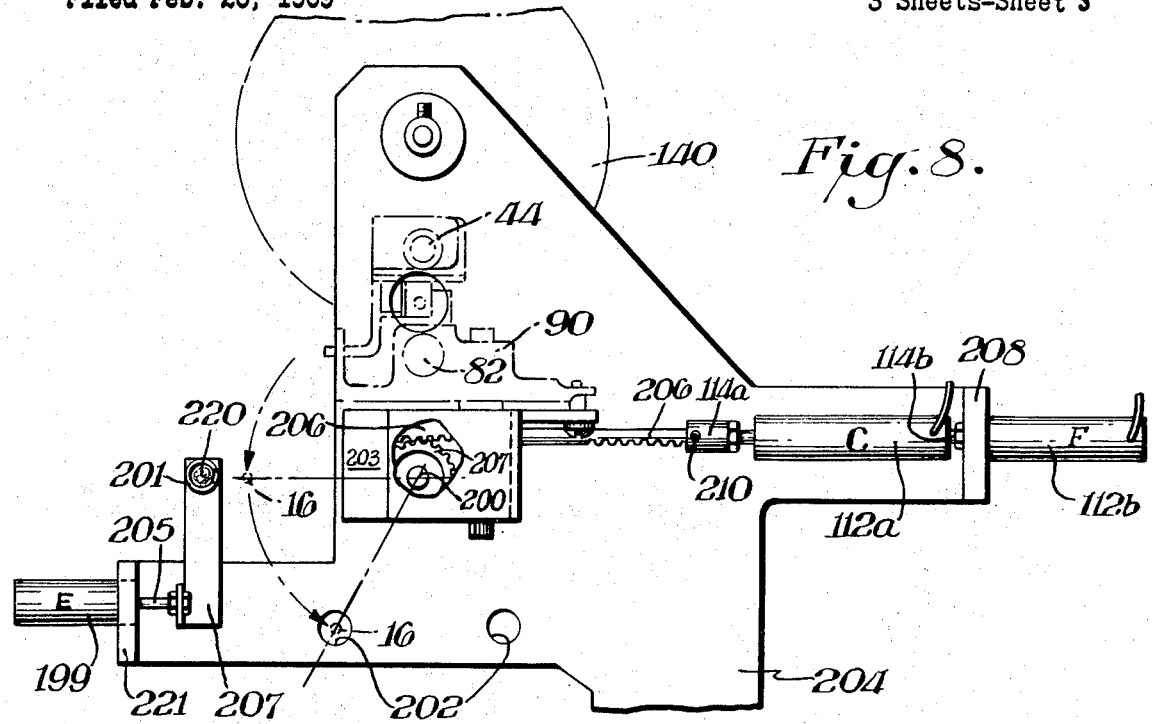
FIG. 8 is a plan view of an alternative embodiment of an automatic sampling system adapted to utilize the auxiliary receptacle.

As may be seen in FIGS. 2 through 4, inclusive, and 11 an auxiliary receptacle, constructed in accordance with one embodiment of this invention, is incorporated in the automatic sampling system described in said Lightner et al. application. The automatic system illustrated is in the form of a detachable assembly adapted to be mounted contiguous to the sample inlet of an analytical instrument. For simplicity of description, the invention will be described in conjunction with a gas chromatograph. In the case of a gas chromatograph, the sample inlet or injection port 10 is sealed by a rubber septum held on by a cap nut 14. The cap nut has a tapered orifice through which the needle 16 of a syringe 18 or other suitable fluid transfer means may pass. The syringe 18 may be a conventional precision fluid syringe as is typically employed in gas chromatography. The syringe has a barrel 20 in which a plunger 22 is adapted to slide to transfer fluid from and to the syringe chamber through the needle 16.

The barrel 20 of the syringe 18 may be held in a two-piece adjustable width, U-shaped bracket 24. The width of the opening of the U-shaped bracket is adjustable as by the sliding member 26 secured by the screw 28 which fits into a slot 30 (FIG. 4) in the sliding member 26. The adjustable width is necessary or desirable to accommodate syringes having different barrel lengths. If a single sized syringe is to be used, the U-bracket 24 may be a unitary piece.

The upright portions 34 of the U bracket 24 each have concave indentations 35 (FIG. 1) in their inner surfaces to provide a means of accommodating and more securely positioning the ends of the barrel 20. The upright 34 of the U-shaped bracket which positions the plunger is slotted at 32 such that the plunger 22 may be slipped in from the side when the barrel is being mounted. In like manner, the upright portion 34 positioning the needle has an orifice (not shown) therein to accommodate the needle 16 which extends therethrough.

The U-shaped bracket 24 contains a side projection 40 a portion of which is bent upwardly, as seen in FIG. 2 of the drawing, to form a side arm 42 on which is mounted a plunger prime mover or actuating means 44. Although any type of prime mover 44 may be employed, those that are particularly preferred for use with this invention are prime movers capable of providing a linear or displacement type motion under the actuation of a digital signal. One type of prime mover which has been utilized successfully is a pneumatic cylinder having a barrel 46 and a piston 48. The barrel 46 has its exterior portion threaded and secured to the side arm 42 as by a nut 50 (FIG. 4). Air or other fluid, which may be used to actuate the prime mover 44, in introduced through a nipple 52. The piston 48 is normally extended as seen most clearly in FIG. 4, and when actuated, as by air pressure applied to the nipple 52, pulls the piston 48 into the barrel 46 as illustrated by the phantomed lines in FIG. 4. The prime mover 44 is spring loaded so that when the air pressure is released, the piston 48 returns to the extended position illustrated in FIG. 4 by the solid lines. In the alternative, a double acting pneumatic cylinder may be used in which event the piston 48 is driven in both directions.

Secured to the end of the plunger piston 48 as by a pair of nuts 62 is an L-shaped bracket 60. The L-shaped bracket 60 extends along the side of the barrel 46 and mounts a clip 64 which engages the plunger thumb disc 66 (seen most clearly in FIG. 4) on the end of the plunger 22. The plunger clip 64 is mounted in a box-shaped mount 65 formed by bending a rectangular piece of sheet metal having one side attached as by a screw 66 to a slot 68 formed in the L-bracket 60. This permits the length of the plunger stroke to be adjusted according to the size syringe employed. The plunger clip 64 consists of a piece of spring metal 68 fastened to the box-shaped mount 65 and bent to accommodate the plunger. The plunger clip 64 is also slotted to permit the plunger thumb disc 66 to be slid into the clip. Other suitable plunger clipping arrangements may be employed.

The side arm 42 of the U-bracket 24 has a screw 70 inserted therethrough which extends through a slot 72 in the L-bracket 60 to limit the axial motion (FIG. 4) of the L-bracket when the prime mover 44 is actuated. A knurled nut 74 threaded on the screw 70 may be turned to adjust the length of the plunger stroke by limiting the return stroke of piston 48. The L-shaped bracket 60 has a projection 61 which engages a guide slot 63 in the bracket side arm 40 to prevent rotation of the bracket 60 as it is actuated by the plunger of the prime mover 44.

The U-bracket 24, which supports the syringe, is mounted on the end of the piston 80 of a second actuating means or barrel prime mover 82. The second prime mover 82 may be of the same type as the first prime mover 44 and has an input air nipple 84 which causes the plunger or piston 80 to extend lineally from the cylinder 86 which forms the prime mover 82. In this manner, when the second prime mover is actuated, the syringe barrel 20 is moved along an axis parallel to the barrel axis under the control of a digital input signal which energizes the prime mover. The plunger prime mover 44 thus can be energized to operate the plunger 22 of the syringe regardless of the position of the barrel 20.

The cylinder 86 of the second or barrel prime mover 82 in turn is mounted on a pivot assembly 90 which is in the general form of an angle bracket having a pivot point 94 through which a pivot rod 96 extends. The pivot rod 96 is secured to an L-flange 98 forming part of the mounting assembly 92 by a knurled knob 100 which is secured to the pivot rod as by a set screw. An axially directed pin (not shown) on the knob 100 engages a receptacle formed in the L-flange 98 to prevent the knob's rotation. A coil spring 102 placed over the rod 96 has one end secured in a slot in the pivot rod 96 and the other end secured as seen at 104 to the pivot assembly 90. The spring 102 is loaded such that the pivot assembly 90 is biased to an upright or vertical (cylinders up) position in the drawing.

Secured to the lower portion of the L-flange 98 is the barrel 110 of a pivot prime mover 112 (FIG. 2). The pivot prime mover 112 has a piston 114 which when the prime mover is energized, the syringe 18 is pivoted from a vertical to a horizontal position. The pivot prime mover 112 is spring loaded so that the syringe 18, aided by the coil spring 102, normally assumes an upright position, i.e., the axis of the syringe and barrel are vertical. An air nipple 118 is available on the barrel 110 for energization of the pivot prime mover. Here again the pivot prime mover 112 may be the same as the prime movers previously disclosed herein.

A vertically disposed turntable supporting rod 120 is secured to an angular flanged portion 122 (FIGS. 2 and 3) of the L-flange 98 as by screws 124. The L-flange 98 has an angle bracket 130 secured thereto as by a bolt having a knurled adjusting knob 132 (FIG. 3). Separately attached to the L-flange 98 is an injection port frame bracket 134 having an orifice 136 which encompasses the cap nut 14 of the injection port. The injection port flange bracket 134 may have separate adjusting screws to permit its adjustment relative to the L-flange 98 to facilitate the proper adjustment and alignment of the syringe needle 16 with the injection port 10. The particular details of the manner in which the L-flange 98 of the mounting assembly 92 is attached to the analytical instrument does not form a part of this invention. Any suitable means of securing the frame to the instrument may be employed as desired.

The particular details by which the turnable 140 is successively positioned is described in detail in the said Lightner et al application. Briefly, the turntable is illustrated as being generally circular and has a circular row of apertures 141 formed in the peripheral surface thereof. A cylindrical fluid sample container or vial 142 may be positioned within the apertures 141 of the row. Each of the sample containers may be in the form of a vial having a cap or septum 144 enclosing the upper end thereof. A retaining arm 143 mounted on the turntable mounting rod 120 extends across the turntable to a position partially covering the top edges of the vial septums 144 at the sampling position of the syringe. This prevents the vial from becoming dislodged by the syringe action.

The apertures 141 are open at the outer peripheral surface of the turntable to facilitate the indexing of the turntable with respect to the syringe. The indexing may be accomplished by any suitable means such as an electric servo motor or other drive mechanism. One such drive mechanism is described in the said Lightner et al. application and comprises nothing more than a digitally actuated prime mover such as a pneumatic cylinder 154 which operates an arm which engages the successive slots to index the turntable step by step through the different locations or positions. A ratchet (not shown) may secure or lock the turntable in each of the sampling positions.

The several prime movers, including the barrel prime mover 82, the plunger prime mover 44, the pivot prime mover 112 and the indexing prime mover 150, designated respectively by the letters A, B, C and D, are separately actuated by separate gas pressure lines connected to the respective nipples 84, 52, 200 and 154. These nipples are connected through lines (not shown) to energizing valves $V_A$, $V_B$, $V_C$ and $V_D$ illustrated in FIG. 6. The lines or conduits labelled To A, To B, To C, and To D denote the connection of these lines to the respective prime movers A, B, C and D. These valves, designated by the blocks bearing the captions $V_A$, $V_B$, $V_C$ and $V_D$ individually apply gas pressure from a source of pressure 232 connected through a feed conduit 234 to the respective valves $V_A$, $V_B$, $V_C$ and $V_D$. The valves $V_A$, $V_B$, $V_C$ and $V_D$ are individually actuated under the control of electrical signals derived from some control source. In this instance the control source, illustrated as a tape reader 236, is able to read a program punched tape 238 which generates control signals to individually open and close the valves operating the respective prime movers. The particular programming sequence may be readily changed by simply punching a new tape 238 having the desired program as will be described hereinafter. Other control sources may be used as desired. For example, a rotary stepping switch may be used or, in the alternative, control may be achieved directly from a computer which may also control the entire system including the analysis of the data derived therefrom. Thus far the system described is that disclosed by Lightner et al.

In accordance with this invention, an auxiliary receptacle 201, seen most clearly in FIGS. 1 and 5, is secured to the bracket upon which the turntable is mounted. More specifically, an auxiliary receptacle prime mover 199, which is to displace the auxiliary receptacle 201, is secured as screws 233 (FIG. 3) to the bracket arm. The piston 205 of the prime mover 199 extends through the bracket and is bolted to a tab of a folded L-bracket 207 which supports the receptacle 201. The receptacle 201, for example, may be attached as by soldering to the bracket 207. The receptacle 201 is hollow and cylindrical in shape having a tapered lower portion forming a drain. One side wall of the receptacle 201 has a cutaway portion 213 which facilitates the movement of the needle into alignment with the receptacle. A tube 212 which may function as a drain tube or a solvent supply is attached to a nipple on the lower portion of the drain of the receptacle 201. Absorbent cotton or the material 220 may be inserted in the receptacle if desired. The piston 205 is spring loaded to a normally extended position.

The operation of the automatic sampling system, even when used in conjunction with the auxiliary receptacle shown in FIGS. 1 and 5, closely follows that described in the said Lightner et al. application. The syringe 18 has three primary motions, i.e., movement of the syringe barrel along its axis, secondly, movement of the syringe plunger relative to the barrel; and finally, pivoting of the syringe about the pivot point 94 to realign the axis of the syringe alternatively between the sampling container and the sample receiving chamber of the analytical instrument. Using these three basic motions, under the control of any suitable controller, samples may be successively withdrawn from the several sample containers and injected into the input of the analytical instrument. The sequence of the particular operations is under the control of a digital controller and may follow any desired sequence. To these sequences is added a fourth motion provided by the fourth or auxiliary receptacle prime mover 199. With the energization of the auxiliary receptacle prime mover 199, the auxiliary receptacle 201 is positioned such that its axis intersects that of the needle. When deenergized, the auxiliary receptacle is positioned out of the way of the needle to permit the syringe and needle to be fully extended downwardly as seen in FIG. 2.

In a typical sequence of operation, the needle is extended to penetrate the septum of a sample container, the syringe plunger withdrawn, the syringe barrel raised to withdraw the needle, the auxiliary receptacle 201 positioned in line with the axis of discharge of the syringe needle as seen in the phantom representation of FIG. 1 and the plunger depressed to expel the sample into the auxiliary receptacle from which it can pass out through the drain line 212. Next the receptacle 202 is removed from the axis of movement of the needle (the solid representation of FIG. 1). The syringe and needle may then be extended to again penetrate the sample container. This facilitates flushing the syringe and obviates the necessity of discharging the sample upon the top of the sample container which in some cases can cause cross-contamination between the samples. The needle may be flushed several times with the sample from the container to be analyzed prior to the time that the actual sample quantity to be tested is withdrawn into the syringe. This has the beneficial effect of insuring that most contaminants from a previous sample are fully removed from the syringe. Alternatively, a solvent rinse of the syringe may be achieved.

In an alternative embodiment, the auxiliary receptacle illustrated in FIGS. 1 and 5 may be modified to that form illustrated in FIG. 7. In FIG. 7 the auxiliary receptacle, designated by the reference numeral 300, is seen to be hollow and cylindrical in shape having the lower end closed and with a bore 302 through which a nipple 304 extends. A conduit 306 is attached to the nipple 304 and thence to a suitable vacuum source or pump. The upper end of the receptacle 300 is closed by a conventional septum 308 as is used in many analytical instruments and the entire receptacle enclosed within a heater designated by the dashed line 310. Using this arrangement, the syringe needle may be introduced through the septum 308 into the heated interior of the receptacle 300 which interior is at a greatly reduced pressure. This causes any residues remaining within or on the needle of the syringe to be flash vaporized and passed on to the vacuum source. This mainder of the mounting structure for the auxiliary receptacle including the fourth prime mover 199 is the same as described herein in conjunction with FIG. 1.

When the embodiment of FIG. 7 is used, the syringe barrel prime mover is modified to displace the syringe barrel axially between three different positions. One position is that in which the syringe needle is extended sufficiently to penetrate the septum 308 and extend into the interior of the receptacle 300. The second position is that of full down so that the needle penetrates the sample container as previously described. The third position is the up or rest position. A suitable prime mover for meeting this requirement may be two pneumatic cylinders connected in series as is illustrated in conjunction with the embodiments of FIGS. 8 and 9. If both prime movers 112a, 112b are simultaneously energized, the syringe barrel will extend its full length and the needle will penetrate the vial. If only one prime mover is energized, the syringe barrel will extend only part way such as required for the syringe needle to penetrate the septum 308 into the receptacle 300.

Figure 9:
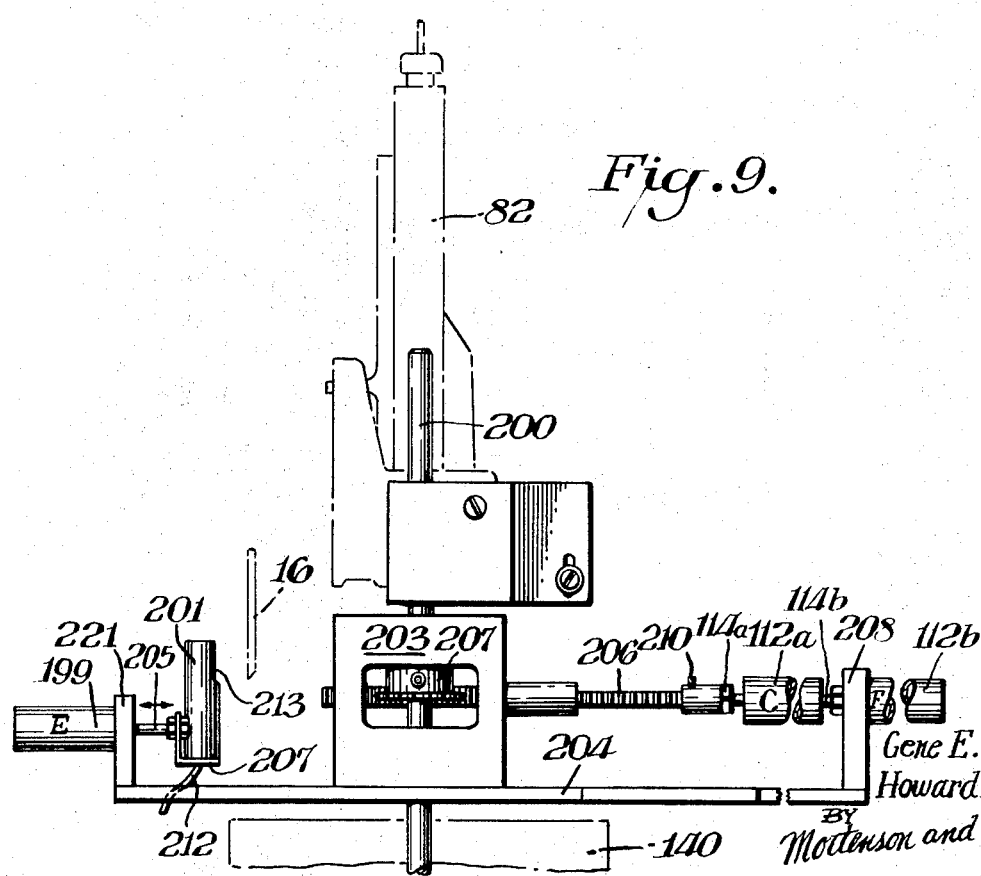
FIG. 9 is a partial elevation view of the automatic sampling system illustrated in FIG. 8.

In the embodiments of the invention described in FIGS. 2–6 the syringe barrel was pivoted and displaced axially to transfer samples between the sampling location, the auxiliary receptacle 201 and the sample receiving chamber. In another embodiment of the invention, the axis of the syringe barrel may be translated and displaced axially. A system for using the auxiliary receptacles of FIGS. 1, 5 and 7 with a translational movement to the syringe barrel axis is shown in FIGS. 8 and 9.

As described in the said Lightner et al. application, the axis of the syringe barrel may be translated along either a line or an arc. The translational movement thus provided is accomplished by changing the manner in which the pivot prime mover (designated C for convenience) acts upon the bracket assembly holding the syringe and plunger prime movers designated for convenience as A and B, respectively. The alternative embodiments shown in FIGS. 8 and 9 permit the axis of the syringe barrel to be translated in an arcuate manner about a point or line, in this case the axis of a rotatable rod 200. Specifically, the barrel prime mover 82, whose piston supports the syringe and the plunger prime movers, is mounted in the same pivot assembly 90 as was the case previously described in conjunction with FIGS. 2 and 4. In this instance, however, the pivot assembly 90 is secured to the rotatable rod 200 as seen most clearly in FIG. 8. Preferably the rod 200 is fitted in a vertical bore formed in the pivot assembly 90 at a location close to the pivot point 94 (FIG. 1) and secured by a set screw, not shown. The rod 200 itself is rotatably mounted in a housing 203 and is journaled in upper and lower bearings therein to permit it free rotation. The housing 203 is secured as by screws (not shown) to a base plate 204 which may be attached if desired to an instrument or other container into which the samples are to be introduced. In this instance, the instrument is illustrated as having a pair of injection ports 202 whose axis are vertically disposed (into the plane of the drawing) such that the base plate 204 mounts upon the top of the instrument.

A driven gear 207 is secured on the rod 200 within the housing 203 to engage a sliding rack gear 206 which in turn is actuated by the C prime mover 112. The C prime mover 112 in this instance preferably is formed of two (C and F) serially connected prime movers 112a and 112b. The second or outer prime mover 112b is mounted to a vertical flange 208 which is part of the base plate 204. The piston 114b of the outer prime mover is secured to the cylinder of the first prime mover 112a such that when it is actuated it drives the first prime mover 112a. In turn the piston 114a is bored to receive and secure to the rack gear 206 as by a set screw 210. The prime movers 112a and 112b are energized by air pressure from the valves $V_C$ and $V_F$, respectively, illustrated in FIG. 6. Hence, the prime movers 112a and 112b are labelled in FIGS. 8 and 9 as C and F, respectively. Alternatively, a single piston prime mover 112 may be used and a U-shaped sleeve controlled by a solenoid used to control the length of the stroke and thereby the amount of rotation imparted by the rack gear 206 to the driven gear 207 and hence ot the rod 200. Rotation of the rod 200 produces a rotation of the entire pivot assembly 90 including the barrel prime mover 82 and the plunger prime mover 44. Thus the syringe 18 may be translated through an arcuate path with its axis remaining parallel to the original barrel axis position. This permits the withdrawal of samples from the normal sampling locations of the sample rack or tray 140 and then the syringe is translated over to the location of the vertically disposed axes of the injection ports 202. The digital control features are still available.

By the utilization either of the solenoid actuated sleeve or the double cylinders, as described, the degree of translation is controlled. The auxiliary receptacle 201 is positioned at an intermediate point of the syringe's translation, as is obtained by the energization of only one cylinder of the prime movers 112a 112b (or the sleeve). Specifically, the entire assembly supporting the auxiliary receptacle 201, as illustrated in FIG. 1, is mounted upon a flange 221 which is part of the base plate 204. Thus, if only one of the prime movers 112a, 112b is energized, the syringe will rotate to the location of the auxiliary receptacle 201. If both are energized the syringe is translated to alignment with the sample receiving chamber. If also the barrel prime mover is energized, in the event that the embodiment of the auxiliary receptacle 300 (FIG. 7) is used, the syringe may be introduced into the receptacle itself.

Alternatively, auxiliary receptacles may be mounted to be positioned into and out of alignment with the axis of the sampling position or the axis of the sample receiving chamber. The auxiliary receptacle may be that illustrated in FIGS. 1 and 5 or that of FIG. 7. In the event the receptacle of FIG. 7 is used, the two-position barrel prime mover as previously described, may be used to permit the needle to be introduced into the heated chamber 300 (FIG. 7).

The apparatus described is particularly versatile and still another embodiment, as illustrated schematically in FIG. 10, makes use of two position pivot prime movers 112a, 112b (or a solenoid controlled motion stopping sleeve) which replace the single prime mover 112 (FIG. 2) to control the pivot angle of the syringe 18 of FIGS. 2–4. By positioning the waste receptacle 201 (or auxiliary receptacle 300, FIG. 7) at this angular location, the syringe 18 may withdraw a sample from the sampling location, illustrated by the block 320 and then be pivoted to a half-way point between the angular position required for injection and that for sample pickup such that it is in alignment with the auxiliary receptacle 201, discharge a sample therein, and then again be returned to the sample containers for another change. When the syringe is thoroughly clean, both prime movers 112a, 112b may be actuated such that the full pivot of the syringe barrel occurs and the syringe axis is now in alignment with the septum of the analytical instrument. The barrel prime mover 82 moves the syringe axially as previously described.

All of the embodiments described are useful in connection with digital control mechanisms. It is with this digital usage that the invention finds its preferred usage. Using digital control signals as described in conjunction with FIG. 6, the several prime movers, i.e., the syringe barrel (A) prime mover 82, the plunger (B) prime mover 44, the first pivot (C) prime mover 112a, the receptacle (E) prime mover 199, the second pivot (F) prime mover 112b (if used), and the sample tray indexing (D) prime mover 150, all may be individually actuated under the control of digital signals. The actuation may occur in any desired sequencing or combination and is readily determined using Boolean algebra techniques. Any of the basic prime movers may vary their stroke length by the use either of the serial connection illustrated in FIG. 8, for example, or by the use of a stop member to control the stroke length of the pistons. By varying the stroke length of the prime movers the thrust of the syringe barrel, the degree of pivoting of the syringe barrel, and the amount of syringe barrel translation may all be controlled.

It is obvious that many embodiments may be made of this inventive concept and that many modifications may be made in the embodiments hereinbefore described. Therefore, it is to be understood that all descriptive matter herein is to be interpreted merely as illustrative, exemplary, and not in a limited sense. It is intended that various modifications which might readily suggest themselves to those skilled in the art be covered by the following claims, as far as the prior art permits.

What is claimed is:

1. In an automatic sampling system having means for successively positioning a plurality of fluid sample containers to a sampling location, a receptacle, a sample receiving chamber, and a fluid transfer tube having an axis of discharge for transferring fluid between said sampling location, said receptacle and said sample receiving chamber, the combination comprising:

actuating means coupled for displacing said tube and said receptacle relative to each other thereby to shift said axis and said receptacle between positions of alignment and non-alignment, said transfer tube being a syringe having a plunger for withdrawing fluid from said container and discharging said fluid into said receptacle, pump means for operating said plunger, and said receptacle having an open end and a side wall shaped to define an open sided aperture to accommodate the introduction of a portion of said syringe through said side wall to coact with said receptacle.

2. An apparatus according to claim 1 wherein said actuating means is adapted to pivot said syringe relative to said receptacle thereby to permit the transfer of said fluid with respect to said receptacle.

3. An apparatus according to claim 1 wherein said actuating means is adapted to position said receptacle into and out of alignment with said axis of discharge of said syringe, thereby to permit the transfer to said fluid with respect to said receptacle.

4. An apparatus according to claim 1 wherein said actuating means is adapted to translate said syringe so that said axis of discharge intersects the open end of said receptacle, thereby to permit the transfer of said fluid with respect to said receptacle.

5. An apparatus according to claim 1 wherein each of said actuating and pump means is operative responsive to digital input signals.

6. An apparatus according to claim 5 which also includes programming means for initiating said input signals, thereby to sequence program the operation of said apparatus in any desired sequence.

7. An apparatus according to claim 1 wherein said actuating means is adapted to shift said syringe between said chamber and said sampling location, and which also includes first lineal displacement means mounted on said actuating means for lineally displacing said syringe and said actuating means relative to each other along said axis, thereby to coact said syringe alternatively with said sampling location, said sample chamber, and said receptacle.

8. In an automatic sampling system including a plurality of fluid sample containers, means for successively positioning the sample containers to a sampling location, and a sample receiving chamber, the combination comprising:

a fluid syringe having a barrel, plunger and needle;

first actuating means for displacing said syringe alternately into alignment with said sampling location and said sample receiving chamber;

second actuating means for displacing the plunger of said syringe to draw fluid into and discharge fluid from said syringe;

a movable waste receptacle for receiving fluid from said syringe, said waste receptacle including a top portion and a bottom portion having an aperture therein;

a drain tube communicating with said waste receptacle through said aperture for directing fluid out of said receptacle;

third actuating means for displacing said waste receptacle into and out of alignment with said syringe; and means for controlling said first, second and third actuating means to cause said syringe to transfer fluid from a sample container into said waste receptacle and thereafter into said sample receiving chamber.

9. The apparatus according to claim 8, said waste receptacle having the top portion thereof closed by a septum through which the needle of said syringe is inserted; and means for heating the interior of said waste receptacle, thereby to vaporize residual fluid on said needle when inserted into said receptacle.

10. The apparatus according to claim 8, said first, second and third actuating means each being operable in response to digital signals; and said controlling means including programming means for producing digital signals to sequence the operation of the sampling system.

References Cited

UNITED STATES PATENTS

| | | | |
|---|---|---|---|
| 3,096,653 | 7/1963 | Martin et al. | |
| 3,178,266 | 4/1965 | Anthon | 23—253 |
| 3,252,330 | 5/1966 | Kling. | |
| 3,266,322 | 8/1966 | Negersmith et al. | |
| 3,302,452 | 2/1967 | Leslie | 73—64.1 |
| 3,418,080 | 12/1968 | Rochte et al. | |
| 3,430,495 | 3/1969 | Burge. | |
| 3,443,439 | 5/1969 | Curz. | |
| 3,449,959 | 6/1969 | Grimshaw. | |

S. CLEMENT SWISHER, Primary Examiner

H. C. POST III, Assistant Examiner

UNITED STATES PATENT OFFICE
CERTIFICATE OF CORRECTION

Patent No. 3,529,475            Dated September 22, 1970

Inventor(s) Gene E. Lightner and Howard B. Muhlestein

It is certified that error appears in the above-identified patent and that said Letters Patent are hereby corrected as shown below:

Column 2, line 67, "rear" should read -- read --;

Column 7, between lines 14 and 15, insert the following -- is an effective method of cleaning the needle. The re-   --;

Column 8, line 21, "ot" should read -- to --;

Column 9, line 23, "embodmients" should read -- embodiments --.

SIGNED AND
SEALED
NOV 24 1970

(SEAL)
Attest:

Edward M. Fletcher, Jr.
Attesting Officer

WILLIAM E. SCHUYLER, JR.
Commissioner of Patents